United States Patent

Yacoub

(10) Patent No.: US 9,670,858 B2
(45) Date of Patent: Jun. 6, 2017

(54) IDENTIFICATION OF AIR AND/OR FUEL METERING DRIFT

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1150 days.

(21) Appl. No.: 12/853,621

(22) Filed: Aug. 10, 2010

(65) Prior Publication Data

US 2011/0056265 A1    Mar. 10, 2011

(30) Foreign Application Priority Data

Sep. 8, 2009    (DE) ........................ 10 2009 029 257

(51) Int. Cl.
  *G01F 25/00*    (2006.01)
  *F02D 41/22*    (2006.01)
  *F02D 41/14*    (2006.01)
  *F02D 41/18*    (2006.01)

(52) U.S. Cl.
  CPC ......... *F02D 41/22* (2013.01); *F02D 41/1454* (2013.01); *F02D 41/1461* (2013.01); *F02D 41/1462* (2013.01); *F02D 41/18* (2013.01); *F02D 2200/0616* (2013.01); *Y02T 10/40* (2013.01)

(58) Field of Classification Search
  None
  See application file for complete search history.

(56) References Cited

U.S. PATENT DOCUMENTS

| | | | |
|---|---|---|---|
| 6,089,077 A | 7/2000 | Daniels | |
| 6,598,470 B2 | 7/2003 | Ludwig et al. | |
| 6,775,623 B2 | 8/2004 | Ali et al. | |
| 7,293,555 B2 | 11/2007 | Kato et al. | |
| 7,735,478 B1 | 6/2010 | Dagci et al. | |
| 8,201,444 B2 | 6/2012 | Wang et al. | |
| 8,215,098 B2 | 7/2012 | Wang | |
| 2008/0010973 A1* | 1/2008 | Gimbres | F02D 35/023 60/276 |
| 2008/0202098 A1* | 8/2008 | Fisher et al. | 60/285 |
| 2011/0041481 A1* | 2/2011 | Fujita | 60/287 |

FOREIGN PATENT DOCUMENTS

DE    102004044463 A1    9/2005

OTHER PUBLICATIONS

German Search Report dated Mar. 26, 2010, pp. 1-3.

* cited by examiner

*Primary Examiner* — Robert R Raevis
(74) *Attorney, Agent, or Firm* — Julia Voutyras; Brooks Kushman P.C.

(57) ABSTRACT

The disclosure relates to a system and method for identifying whether a difference between measured lambda and computed lambda, based on mass air flow and mass fuel flow, is due to a drift in fuel metering or a drift in air metering. The determination is based on also measuring exhaust gas NOx using a NOx sensor. By comparing the measured NOx to modeled NOx, drift can be attributed appropriately to the air flow measurement and/or the fuel flow measurement. Appropriate correction in the calibration can be undertaken to overcome sensor drift and/or drift in the fuel injector/fuel system flow characteristics.

10 Claims, 2 Drawing Sheets

IDENTIFICATION OF AIR AND/OR FUEL METERING DRIFT

CROSS-REFERENCE TO RELATED APPLICATIONS

This application claims foreign priority benefits under 35 U.S.C. §119(a)-(d) to DE 10 2009 029 257.8, filed Sep. 8, 2009, which is hereby incorporated by reference it its entirety.

BACKGROUND

1. Technical Field

The disclosure relates to a method for identifying and correcting drift of fuel and/or air quantity metering in an internal combustion engine.

2. Background Art

Measuring an exhaust-gas lambda value is one possibility for identifying a drift in the fuel metering or in the air quantity metering. This may be achieved by virtue of an estimated lambda value being calculated on the basis of a measured mass air flow and the original set value of the fuel quantity. The measured mass air flow may be determined by an mass air flow sensor, a so-called MAF sensor.

The drift of the MAF sensor with progressive service life may amount to up to +/−5%. The drift of the fuel injection quantity with progressive service life may amount to up to +/−15%. In background systems, it is not possible to determine whether the drift is to be attributed primarily to the parameter "air" or to the path of the MAF sensor or to the parameter "injected fuel" for example on account of a blocked injector or injector system or on account of wear of the injector or of the injector system.

The invention is therefore based on the object of providing a method of the type specified in the introduction, by means of which it is possible to determine which parameter the deviation is to be attributed to, in order to be able to reset said parameter in a targeted fashion.

SUMMARY

To overcome at least one problem, a lambda sensor and a NOx sensor are used to allow detection of whether drift is occurring in fuel metering and/or air metering. In one embodiment, a first NOx value is estimated based at least on a measured mass air flow, a measured lambda, and an amount of burned gas in the intake gas. NOx is also measured. A first delta NOx based on a difference between the first NOx value and the measured NOx is determined. A first delta NOx value is compared to a first threshold and a drift in a mass fuel flow measurement is inferred when the first delta value is less than the first threshold. If such a drift in mass fuel flow, calibration coefficients associated with the mass fuel flow measured are corrected. In some embodiments, the first NOx value is further based on engine operating conditions. In some embodiments, the first delta NOx is based on the difference between the first NOx value and the measured NOx squared integrated over a predetermined period of time.

A second NOx value is based at least on a measured mass fuel flow, the measured lambda, and the amount of burned gas in the intake gas, a second delta NOx based on a difference between the second NOx value and the measured NOx is determined. A second delta NOx value is compared to a second threshold; and a drift in a mass air flow measurement is inferred when the second delta value is less than a second threshold. Calibration coefficients associated with the mass air flow measurement are corrected when the drift in mass fuel flow is inferred.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
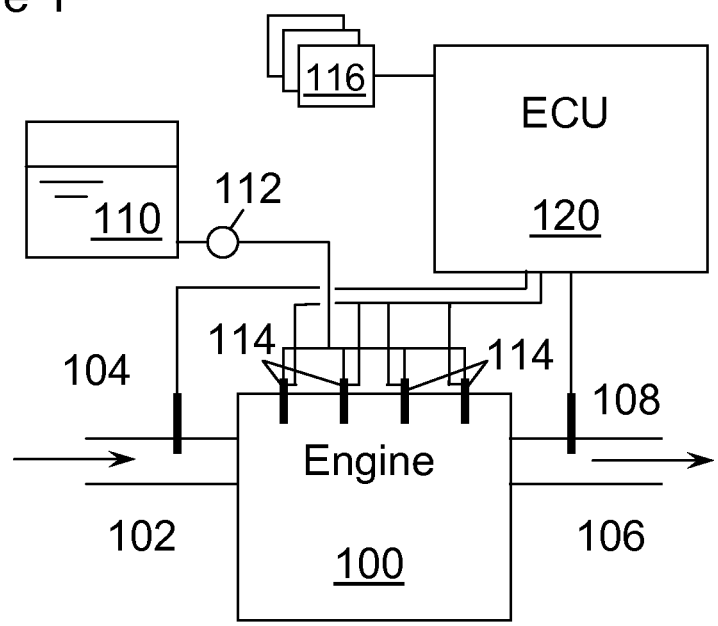
FIG. 1 is a schematic of an internal combustion engine.

FIG. 1 shows an engine 100 having an intake 102 with a mass air flow (MAF) sensor 104 disposed in intake 102. Alternatively, mass air flow can be determined by other combinations of sensors, such as can determine engine speed and intake density. Engine 100 has an exhaust 106 with a sensor 108 or sensors. Sensor 108 may be an exhaust oxygen sensor (lambda sensor) based on which stoichiometry in the exhaust can be determined. Stoichiometry can be expressed as an air-fuel ratio, equivalence ratio, lambda, as examples. Herein, lambda is used. In some embodiments, sensor 108 is a combine NOx/O2 sensor. Alternatively, individual sensors for NOx and O2 are provided. Fuel tank 110 is coupled to a fuel pump 112 (alternatively, multiple fuel pumps) to provide fuel injectors 114. An electronic control unit (ECU) 120 is coupled to the sensors 104, 108, and other engine sensors 116, such as engine speed, fuel injection pressure, intake temperature, exhaust gas recirculation parameters, as examples. Also, ECU 120 commands injection events to fuel injectors: number of events, timing of events, and duration of events.

Figure 2:
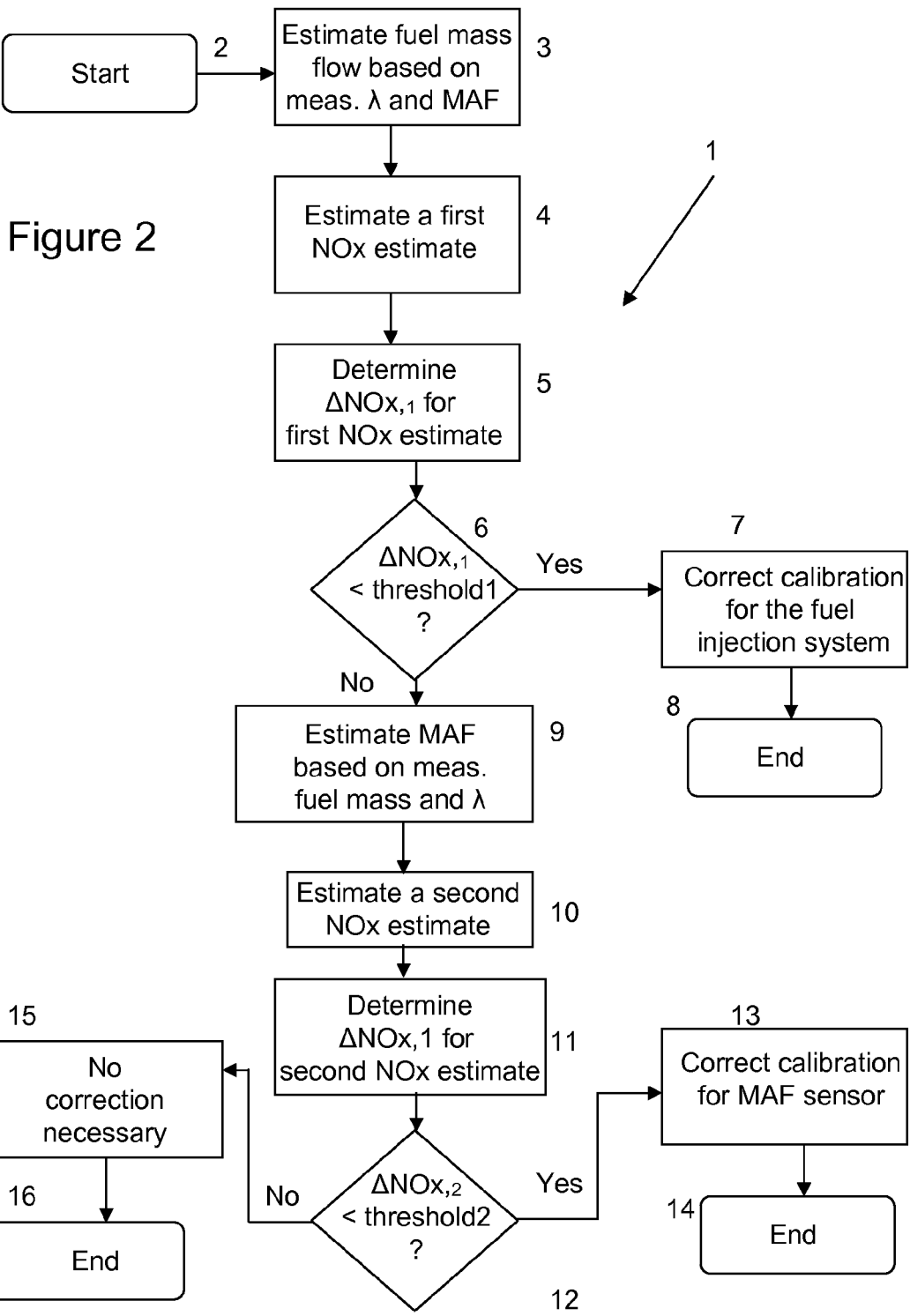
FIG. 2 is a process diagram of the procedure according to an embodiment of the disclosure.

FIG. 2 shows a process diagram 1 for identifying and correcting a drift in a fuel and/or air quantity metering from commanded quantities in internal combustion engines. Within the context of this disclosure, drift is a slow change of a value from a predefined magnitude over time.

Based on a lambda sensor, it can be determined if there is a drift in the air metering or the fuel metering. But, based on a single sensor, it cannot be determined which is causing the drift. According to an embodiment of the disclosure, the NOx sensor reading is used as a second measure of drift. By using both sensor signals, a drift can be attributed to either the fuel or air metering and an appropriate correction can be applied.

Referring to FIG. 2, process 1 begins in a start block 2. In block 3, an estimated fuel mass flow is determined based on lambda and a mass air flow as determined based on the mass air flow (MAF) sensor. The lambda and MAF measurements are assumed accurate and the fuel flow is determined from those measurements. In block 4, a first NOx value is determined based on a NOx model using estimated fuel mass flow (from block 3), measured lambda, MAF, burned mass proportion in the intake gas, and the operating state of the internal combustion engine.

In block 5, a first delta NO$_x$ ($\Delta$NO$_{x,1}$) for the first NOx value is determined. For this purpose, a difference between the measured NO$_x$ value and the previously estimated first NO$_x$ value (block 4) is determined. The difference between the two values is squared and integrated over a predefined time window of for example 300 seconds.

In a decision block 6, it is determined whether the first delta NO$_x$ for the first NOx value is smaller than a first threshold value. If this is the case, control passes to block 7 in which drift of the injector or of the fuel injection system is inferred so that a correction to the injector or the injection system calibration is applied. Control passes then to block 8 where the process ends.

Within the context of the disclosure, the first threshold value is a measured magnitude which is determined during a calibration of the internal combustion engine during test runs for nominal emission levels.

If it is detected in decision block 6 that the first delta NO$_x$ is greater than or equal to a first threshold, control passes to block 9.

In block 9, a mass air flow is estimated based on measured lambda and the injected fuel quantity. That is, accuracy in lambda and the injected fuel quantity is assumed and an estimated mass air flow is determined based on those.

Subsequently, in a block 10, a second estimate of NOx emissions is based on fuel mass flow, the estimated MAF signal, lambda, estimation of burned mass proportions in the intake gas, and operating states of the internal combustion engine.

In a block 11, a second delta NO$_x$ ($\Delta$NO$_{x,2}$) for the second estimate is determined. For this purpose, a difference between the measured NOx and the previously (block 10) second estimated NOx is determined. The difference is integrated over a predefined time window of for example 300 seconds.

In a decision block 12, it is detected whether the second delta NO$_x$ is smaller than a second threshold. If this is the case, control passes to block 13 in which drift of the MAF sensor is inferred appropriate correction of the MAF sensor is carried out. The method then ends in a block 14.

If, in decision block 12, it is detected that the second delta NO$_x$ is greater than or equal to the second threshold, control passes to block 15 and no adaptation or correction is applied. Control then ends in block 16. Process 1 can be repeated periodically.

With the method according to the disclosure, it is possible to determine whether a drift in air metering or a drift in fuel metering is causing a drift between lambda as measured and lambda as determined based on MAF and commanded mass fuel flow. For this purpose, a lambda sensor and an exhaust-gas NO$_x$ sensor are used. In one embodiment, the two sensors may also be combined in one component. The proposed solution is based on a direct measurement not only on lambda in the exhaust gas, but also on NO$_x$ concentration.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the state of vehicle accessories. However, to maintain a desirable cost structure, a satisfactory estimation of some accessory quantities may be ascertained by inferring from a lesser set of sensor data. The embodiments described as being less desirable relative to other embodiments with respect to one or more characteristics are not outside the scope of the disclosure as claimed.

What is claimed:

1. A method comprising:
   by a controller:
   estimating a first NOx value based at least on a received sensor signal indicating measured mass air flow;
   inferring fuel metering drift in a mass fuel flow measurement in response to a delta NOx value representing a difference between the first NOx value and a measured NOx value from an associated sensor being less than a first threshold and
   controlling an engine in response to the fuel metering drift.

2. The method of claim 1, further comprising:
   correcting calibration coefficients associated with the mass fuel flow measurement in response to the inferring of fuel metering drift.

3. The method of claim 1 wherein estimating the first NOx value is further based on operating conditions of the engine.

4. The method of claim 1 wherein the delta NOx value is based on a difference between the first NOx value and the measured NOx value squared with the squared difference integrated over a predetermined period of time.

5. A method, comprising:
   by an engine controller:
   estimating NOx based on at least one measured parameter;
   measuring NOx using at least one sensor of an engine;
   determining a delta NOx based on the estimated NOx and the measured NOx;
   detecting drift in air metering when the delta NOx is less than an associated threshold; and
   controlling the engine responsive to the detected drift in air metering.

6. The method of claim 5, further comprising:
   by the controller:
   estimating a second NOx value based at least on a second measured parameter when the delta NOx is greater than the threshold;
   determining a second delta NOx based on a difference between the second NOx value and the measured NOx;
   comparing the second delta NOx value to a second threshold;
   detecting drift in fuel metering when the second delta NOx value is less than a second threshold; and
   controlling the engine responsive to the detected drift in fuel metering.

7. The method of claim 5 wherein the at least one measured parameter comprises mass air flow.

8. A method, comprising:
   estimating NOx using an engine controller having a NOx model based on values received by the controller from at least one sensor;
   measuring NOx using a NOx sensor coupled to the engine controller;

determining a delta NOx between the estimated NOx and the measured NOx;
detecting drift in the at least one sensor when the delta NOx is less than an associated threshold; and
controlling an engine responsive to the detected drift.

9. The method of claim 8 wherein the at least one sensor comprises a mass airflow sensor.

10. The method of claim 8 wherein the at least one sensor comprises a fuel flow sensor.

\* \* \* \* \*